(12) United States Patent
Jiang

(10) Patent No.: US 10,523,315 B2
(45) Date of Patent: Dec. 31, 2019

(54) SYSTEMS AND METHOD OF MULTI-BAND PILOT TONE BASED OPTICAL PERFORMANCE MONITORING

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/479,666

(22) Filed: Apr. 5, 2017

(65) Prior Publication Data

US 2018/0294874 A1    Oct. 11, 2018

(51) Int. Cl.
| | | |
|---|---|---|
| *H04B 10/00* | (2013.01) |
| *H04B 10/079* | (2013.01) |
| *H04B 10/60* | (2013.01) |
| *H04J 14/02* | (2006.01) |
| *H04L 5/00* | (2006.01) |
| *H04B 10/077* | (2013.01) |

(52) U.S. Cl.
CPC ... *H04B 10/07951* (2013.01); *H04B 10/0775* (2013.01); *H04B 10/60* (2013.01); *H04J 14/02* (2013.01); *H04L 5/0008* (2013.01); *H04L 5/0048* (2013.01)

(58) Field of Classification Search
USPC .................................................. 398/25–33
See application file for complete search history.

(56) References Cited

U.S. PATENT DOCUMENTS

| | | | |
|---|---|---|---|
| 6,046,838 A | 4/2000 | Kon et al. | |
| 6,559,984 B1* | 5/2003 | Lee ............... | H04B 10/0771 |
| | | | 398/5 |
| 7,007,223 B2 | 2/2006 | Boyanapalli | |
| 7,103,281 B1 | 9/2006 | Poustie | |
| 7,539,187 B2 | 5/2009 | Fellman et al. | |
| 7,961,798 B2* | 6/2011 | Jun ................ | H04L 27/2608 |
| | | | 370/499 |
| 8,032,022 B2 | 10/2011 | Zhou et al. | |
| 8,204,377 B2* | 6/2012 | Liu ............... | H04J 14/06 |
| | | | 398/158 |
| 8,218,979 B2* | 7/2012 | Liu ............... | H04B 10/2513 |
| | | | 398/202 |
| 9,143,260 B2* | 9/2015 | Oyama .......... | H04B 10/506 |
| 9,270,381 B2* | 2/2016 | Youn ............. | H04B 10/0775 |
| 9,363,583 B2 | 6/2016 | Jiang et al. | |
| 9,479,260 B2* | 10/2016 | Zhang ........... | H04B 10/5161 |
| 9,614,638 B2 | 4/2017 | Kim et al. | |
| 9,647,767 B2* | 5/2017 | Guo .............. | H04B 10/6164 |
| 9,705,592 B1* | 7/2017 | Schmogrow ... | H04B 10/075 |
| 9,749,056 B2* | 8/2017 | Li ................. | H04B 10/5161 |
| 9,941,960 B2 | 4/2018 | Jiang et al. | |

(Continued)

FOREIGN PATENT DOCUMENTS

| | | |
|---|---|---|
| CN | 1490951 A | 4/2004 |
| CN | 105684328 A | 6/2016 |

(Continued)

*Primary Examiner* — Agustin Bello

(57) ABSTRACT

Systems and methods for applying a pilot tone to multiple spectral bands are provided. An initial signal is divided into multiple spectral bands. A pilot tone is applied to each of the spectral bands, and then the signals are again combined for transmission. The pilot tones differ in some way, for example in phase or frequency.

20 Claims, 14 Drawing Sheets

(56) References Cited

U.S. PATENT DOCUMENTS

| | | |
|---|---|---|
| 10,148,351 B2 | 12/2018 | Jiang et al. |
| 2002/0105634 A1 | 8/2002 | Aoki et al. |
| 2002/0154372 A1 | 10/2002 | Chung et al. |
| 2003/0067646 A1 | 4/2003 | Wan et al. |
| 2004/0005150 A1* | 1/2004 | Takeshita ............... H04B 10/00 398/32 |
| 2004/0237016 A1 | 11/2004 | Sudo |
| 2005/0105917 A1* | 5/2005 | Narusawa ........ H04B 10/50575 398/183 |
| 2005/0117191 A1* | 6/2005 | Griffin ................. G02F 1/0123 359/245 |
| 2006/0078337 A1* | 4/2006 | Harley ................. H04B 10/077 398/186 |
| 2007/0280700 A1 | 12/2007 | Remedios et al. |
| 2008/0130097 A1 | 6/2008 | McKinstrie |
| 2008/0145063 A1* | 6/2008 | Li .......................... H04B 10/40 398/140 |
| 2009/0297153 A1 | 12/2009 | Mutalik et al. |
| 2009/0324223 A1* | 12/2009 | Liu .......................... H04J 14/06 398/65 |
| 2009/0324226 A1* | 12/2009 | Buchali ................ H04L 25/022 398/76 |
| 2010/0080553 A1* | 4/2010 | Kerr ..................... H04B 10/071 398/5 |
| 2010/0104284 A1* | 4/2010 | Liu ...................... H04B 10/255 398/65 |
| 2010/0150577 A1* | 6/2010 | Essiambre ......... H04B 10/5053 398/188 |
| 2010/0329683 A1* | 12/2010 | Liu ................... H04B 10/2513 398/81 |
| 2011/0228838 A1 | 9/2011 | Yang et al. |
| 2012/0057872 A1* | 3/2012 | Freda ................. H04L 27/2602 398/76 |
| 2012/0155887 A1* | 6/2012 | Youn .................. H04B 10/0775 398/182 |
| 2013/0108271 A1* | 5/2013 | Tang ..................... H04L 7/0008 398/66 |
| 2013/0251364 A1* | 9/2013 | Pachnicke ........... H04J 14/0227 398/32 |
| 2013/0259174 A1* | 10/2013 | Qian ...................... H04L 7/0079 375/346 |
| 2014/0056583 A1* | 2/2014 | Giddings ............ H04L 27/2663 398/44 |
| 2015/0215038 A1* | 7/2015 | Jiang ................ H04B 10/07955 398/16 |
| 2015/0372762 A1* | 12/2015 | Zhang ................. H04B 10/5161 398/26 |
| 2016/0204871 A1* | 7/2016 | Li ...................... H04B 10/5161 398/183 |
| 2016/0315724 A1* | 10/2016 | Dou ..................... H04L 27/2657 |
| 2016/0337047 A1* | 11/2016 | Khoshnevisan ..... H04B 17/318 |
| 2017/0041078 A1* | 2/2017 | Le ...................... H04B 10/2543 |
| 2017/0054513 A1* | 2/2017 | Guo ..................... H04B 10/6164 |
| 2017/0093519 A1* | 3/2017 | Deng ..................... H04L 27/26 |
| 2017/0244509 A1* | 8/2017 | Jiang ................... H04J 14/0256 |
| 2017/0255078 A1 | 9/2017 | Jiang |
| 2017/0373748 A1* | 12/2017 | Jiang ................. H04B 10/0775 |
| 2017/0373751 A1* | 12/2017 | Jiang ................... H04B 10/077 |
| 2018/0115407 A1* | 4/2018 | Melikyan .............. H04J 14/021 |
| 2018/0145761 A1* | 5/2018 | Zhuge ................... H04B 10/40 |
| 2018/0294874 A1 | 10/2018 | Jiang |
| 2019/0123819 A1 | 4/2019 | Jiang |

FOREIGN PATENT DOCUMENTS

| | | |
|---|---|---|
| EP | 1439644 A1 | 7/2004 |
| WO | 2000/065764 | 11/2000 |
| WO | 0126256 A1 | 4/2001 |

\* cited by examiner

SYSTEMS AND METHOD OF MULTI-BAND PILOT TONE BASED OPTICAL PERFORMANCE MONITORING

FIELD

This disclosure relates to optical performance monitoring using pilot tones.

BACKGROUND

In optical networks, for example dense wavelength division multiplex (DWDM) systems, a plurality of channels are multiplexed. The term channel is used to refer to a wavelength channel, also known as an optical wavelength channel. In many such systems, a pilot tone is used for optical performance monitoring (OPM), or example to measure the power of each channel. The pilot tone is a small and low-frequency modulation (e.g. kHz to MHz) applied to a high-speed optical channel. A pilot tone provides an in-band ancillary channel for performance monitoring. Each channel is modulated with a different pilot tone (frequency). Accordingly, the power of a particular pilot tone can be useful for indicating the power of the high speed optical channel in a wavelength division multiplexed (WDM) system.

However, with conventional pilot tones, there exist a stimulated Raman scattering (SRS) effect and a chromatic dispersion (CD) fading effect. The power measurement accuracy is severely affected by these two effects. The SRS effect decreases with pilot tone frequency, whereas the CD fading effect mainly increases with pilot tone frequency. As a result, in some scenarios, it is not possible to select one pilot tone frequency with acceptable SRS and CD fading effects.

Accordingly there is a need for an improved pilot tone method and system.

SUMMARY

Generally, embodiments of the present disclosure provide a method and apparatus for generating multi-band pilot tones, and method and apparatus for receiving such pilot tones and performing optical channel performance monitoring based on such pilot tones.

According to one aspect of the present invention, there is provided a method comprising: applying a respective pilot tone to each of at least two of a plurality of spectral bands to produce a respective spectral band with applied pilot tone, the pilot tones differing from each other; combining the spectral bands with applied pilot tones and any remaining spectral bands to which a pilot tone was not applied to produce a combined time domain digital signal; and converting the combined time domain digital signal to an optical channel signal.

In some embodiments, the method further comprises spectrally dividing a time domain digital signal into the plurality of spectral bands.

In some embodiments, at least two the plurality of spectral bands are digital sub-bands from a same source or from different sources.

In some embodiments, a respective pilot tone is applied to every spectral band of the plurality of spectral bands.

In some embodiments, there is at least one remaining spectral band to which a pilot tone was not applied.

In some embodiments, the pilot tones differ from each other in that they carry different pilot tone data.

In some embodiments, the pilot tones differ from each other in that each pilot tone has a different pilot tone frequency.

In some embodiments, the pilot tones carry the same pilot tone data.

In some embodiments, the pilot tones carry different pilot tone data.

In some embodiments, the pilot tones have the same frequency and differ from each other in that each has a different pre-phase.

In some embodiments, the pilot tone pre-phases are selected based on a compromise between improving fading with higher dispersion, and degrading fading with lower dispersion.

In some embodiments, spectrally dividing the time domain digital signal and applying the pilot tones comprises: applying an FFT to the time domain digital signal to produce a frequency domain signal; splitting the frequency domain signal into the plurality of spectral bands; applying a respective IFFT to each of the plurality of spectral bands to produce a respective waveform; and multiplying each waveform with the respective pilot tone.

In some embodiments, the method further comprises changing at least one of the pilot tones over time.

In some embodiments, changing at least one of the pilot tones over time comprises changing at least one of: modulation depth; pilot tone frequency; pilot tone phase; a number of pilot tones.

According to another aspect of the present invention, there is provided a method comprising: receiving an optical channel signal in which different pilot tones have been applied to each of at least two sub-bands; performing optical channel performance monitoring based on detecting the pilot tones.

In some embodiments, a respective pilot tone is applied to every spectral band of a plurality of spectral bands of the optical channel signal.

In some embodiments, there is at least one spectral band of the optical channel signal to which a pilot tone was not applied.

In some embodiments, the pilot tones differ from each other in that they carry different pilot tone data.

In some embodiments, the pilot tones differ from each other in that each pilot tone has a different pilot tone frequency, the method further comprising performing the optical channel performance monitoring by: performing a respective pilot tone detection for each pilot tone.

In some embodiments, the pilot tones carry the same pilot tone data.

In some embodiments, the method further comprises combining detection results for the respective pilot tone detections to produce an overall detection result and to detect the pilot tone data.

In some embodiments, the pilot tones carry different pilot tone data.

In some embodiments, the pilot tones have the same frequency and differ from each other in that each has a different pre-phase, the method further comprising performing the optical channel performance monitoring by: performing detection as if a single pilot tone had been applied across an entire spectral band of the optical channel signal.

According to another aspect of the present invention, there is provided an apparatus comprising: a pilot tone modulator for applying a respective pilot tone to each of at least two of a plurality of spectral bands to produce a respective pilot tone modulated spectral band, the pilot tones differing from each other; a spectral band combiner for recombining the pilot tone modulated spectral bands and any remaining spectral bands that were not modulated by respective pilot tones to produce a combined time domain digital signal; an electrical to optical modulator for converting the combined time domain digital signal to an optical channel signal.

In some embodiments, the apparatus further comprises a frequency band divider for spectrally dividing a time domain digital signal into the plurality of spectral bands.

In some embodiments, the apparatus is configured to apply a respective pilot tone to every spectral band of the plurality of spectral bands.

In some embodiments, the apparatus is configured to generate pilot tones that differ from each other in that they carry different pilot tone data.

In some embodiments, the apparatus is configured to generate pilot tones that differ from each other in that each pilot tone has a different pilot tone frequency.

In some embodiments, the apparatus is configured to generate the pilot tones having the same frequency and differing from each other in that each has a different pre-phase.

In some embodiments, the frequency band divider is configured to: apply an FFT to the time domain digital signal to produce a frequency domain signal; split the frequency domain optical channel signal into the plurality of spectral bands; applying a respective IFFT to each of the plurality of spectral bands to produce a respective waveform.

According to another aspect of the present invention, there is provided an apparatus comprising: a receiver for receiving an optical channel signal in which different pilot tones have been applied to each of at least two sub-bands; an optical channel performance monitor for performing optical channel performance monitoring based on detecting the pilot tones.

BRIEF DESCRIPTION OF THE DRAWINGS

Embodiments of the disclosure will now be described with reference to the attached drawings in which.

DETAILED DESCRIPTION

Figure 1:
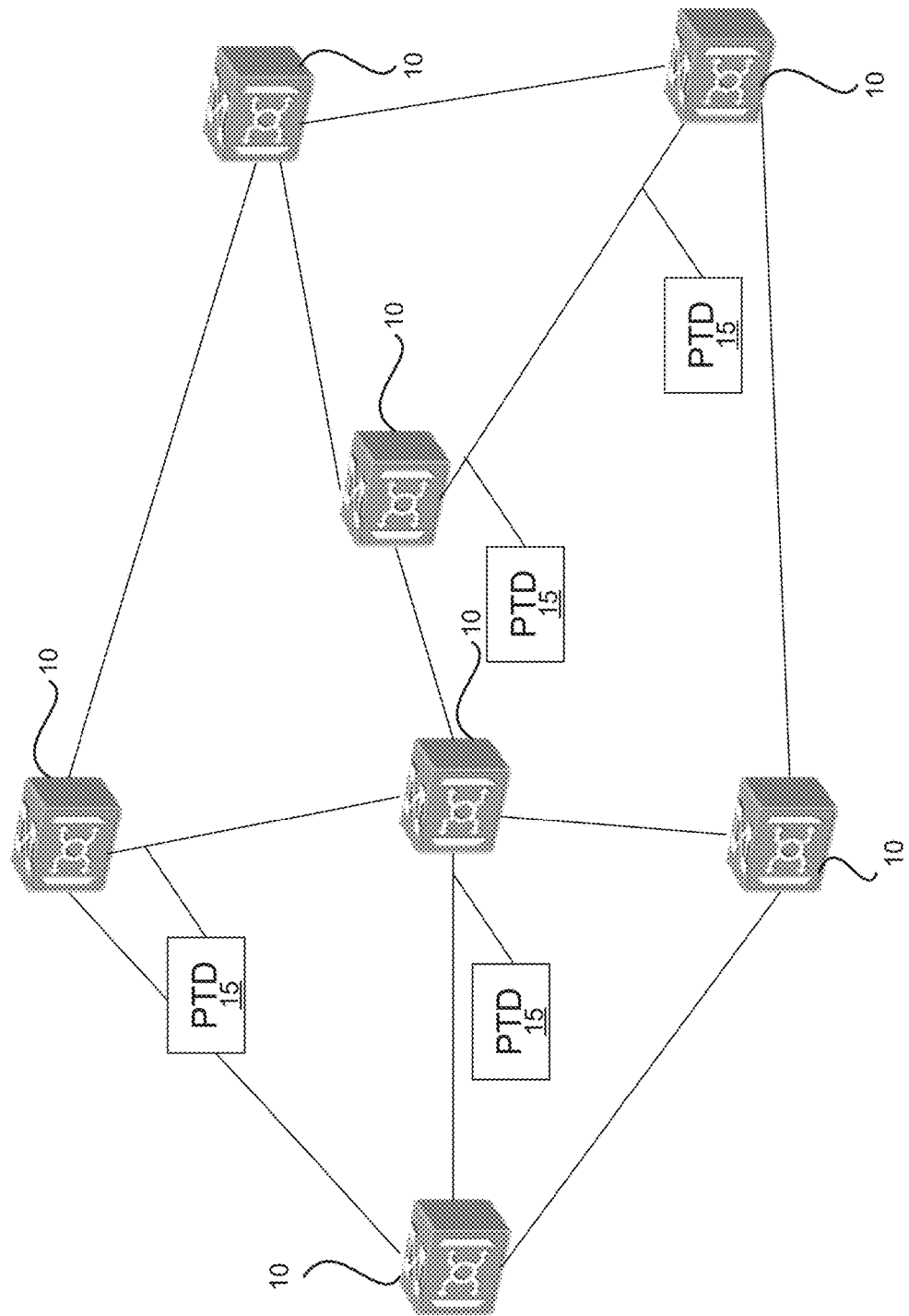
FIG. 1 illustrates an optical network having a plurality of nodes.

Generally, embodiments of the present disclosure provide a method and apparatus for generating multi-band pilot tones, and method and apparatus for receiving such pilot tones and performing optical channel performance monitoring based on such pilot tones. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

As depicted in FIG. 1, an optical network may have a plurality of nodes, each node including a reconfigurable optical add-drop multiplexer (ROADM) 10. A continuous pilot tone signal can be used to monitor the channel power. Such a pilot tone can be further modulated to carry channel characterizing information. The network may also include a plurality of pilot tone detectors (PTD) 15 at various locations in the optical network to monitor channel information, such as presence and optical power level of individual wavelength channels, modulation format, baud rate, and/or other channel characteristics. While not shown, it should be appreciated that each PTD 15 typically includes a low-speed photodiode, amplification circuitry, analog-to-digital converter, and a digital signal processor (DSP).

Figure 2:
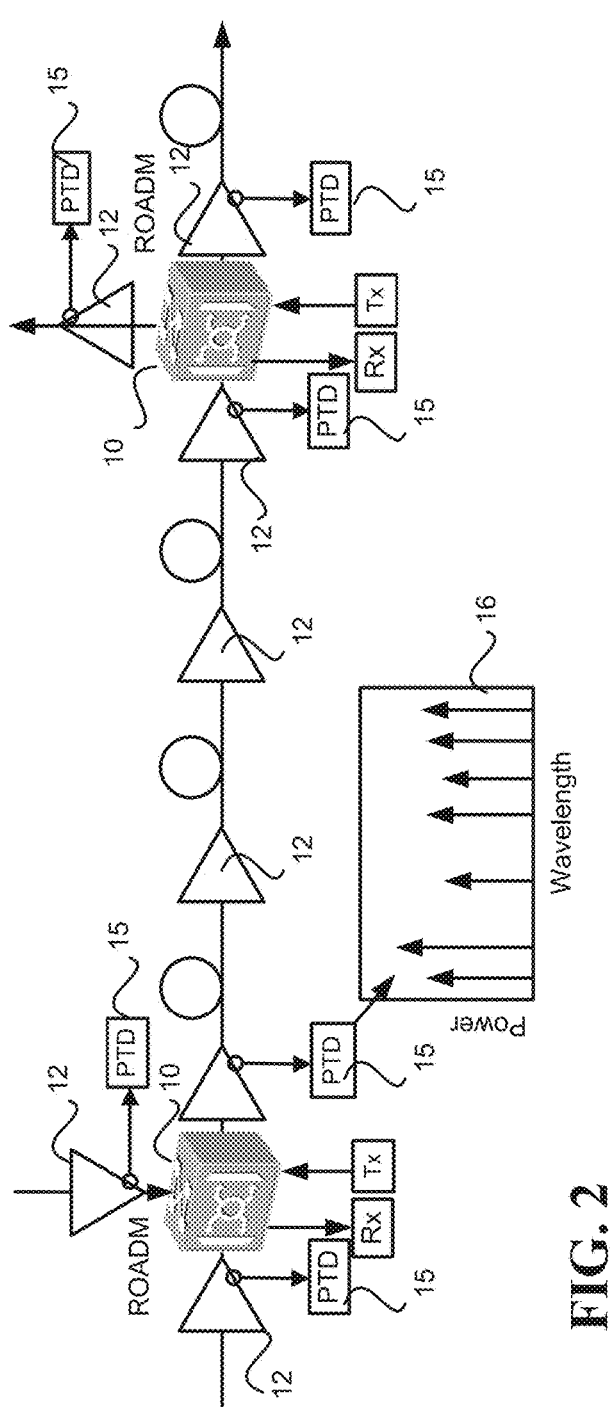
FIG. 2 illustrates more details of a link between two reconfigurable optical add-drop multiplexers (ROADMs)

FIG. 2 illustrates more details of link between two ROADMS 10. One ROADM 10 can drop one or more channels from a received DWDM signal at receivers Rx, add one or more channels generated by transmitters Tx, and pass thru other channels. In some cases dropped channels are converted from optical to electrical domains, and added channels are converted from electrical to optical domains. Otherwise, channels are switched or passed thru in the optical domain. A link between ROADMS typically includes a plurality of optical amplifiers 12 for amplifying optical signals. Each PTD 15 can detect the pilot tones of all the DWDM channels. The power of each pilot tone can be determined e.g. by digital processing, as shown in box 16.

When there is more than one channel, energy is transferred to longer wavelength from a shorter wavelength due to the SRS effect. This energy transfer happens between any two channels. Many factors affect SRS, including power, number of spans, number of channels, channel distribution, and fiber type. In the C band, the SRS crosstalk is approximately proportional to the pilot tone wavelength difference between the two channels.

In a similar manner, low frequency pilot tone modulation on one channel is also transferred to other channels. Because of this SRS effect, the detected tone power also includes contributions from other channels.

Figure 3:
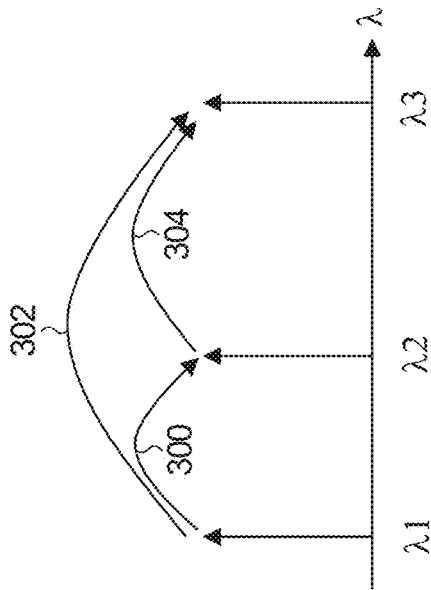
FIG. 3 is a graphical depiction of the SRS effect.

Referring to FIG. 3, shown is an example, in which wavelength channel λ1 has low frequency pilot tone modulation with frequency f1. Due to SRS, f1 will also appear on wavelength channels λ2 and λ3 as indicated by arrows 300,302 respectively. Similarly, wavelength channel λ2 has low frequency pilot tone modulation with frequency f2 which will also appear on wavelength channel λ3 as indicated by arrow 304. Note that the energy transfer is bidirectional: energy is transferred from a shorter wavelength to a longer wavelength, leading to power increase on the longer wavelength; on the other hand, a longer wavelength draws energy from the shorter wavelength, leading to power decrease on the shorter wavelength. As such f2 will also appear on wavelength λ1.

The SRS crosstalk error accumulates in multi-span systems. SRS crosstalk caused error can easily be more than 5 dB in multi-span systems. The error can be so large that even the channel detection can be wrong.

Figure 4A:
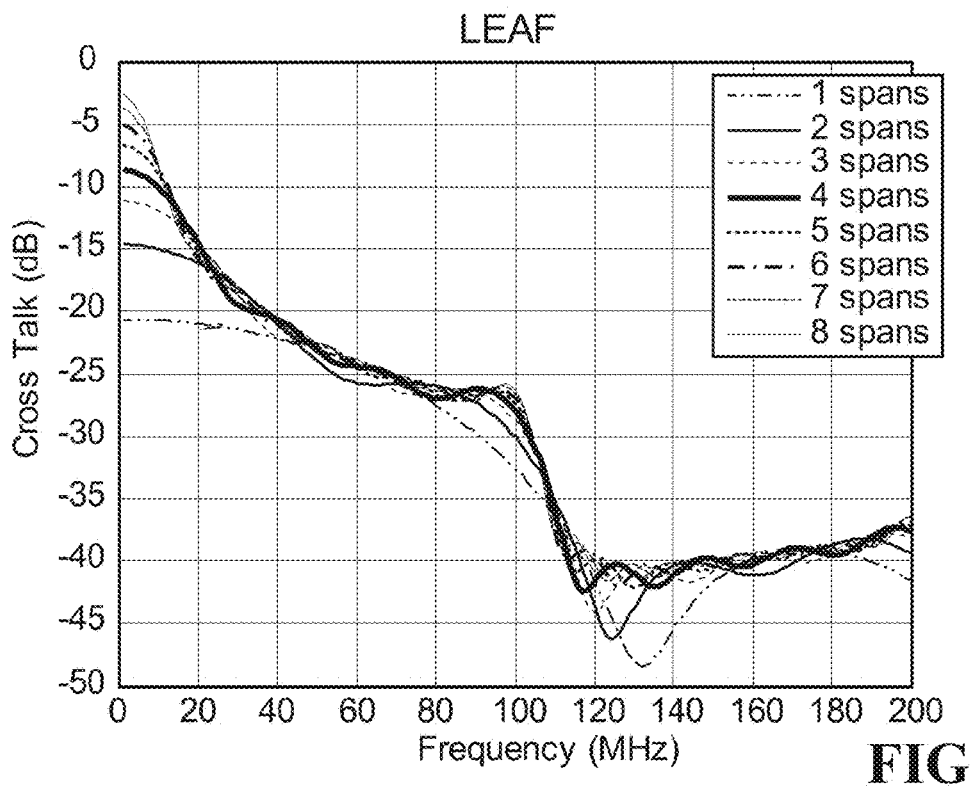
FIGS. 4A and 4B show an example of the frequency dependence of SRS.
Figure 4B:
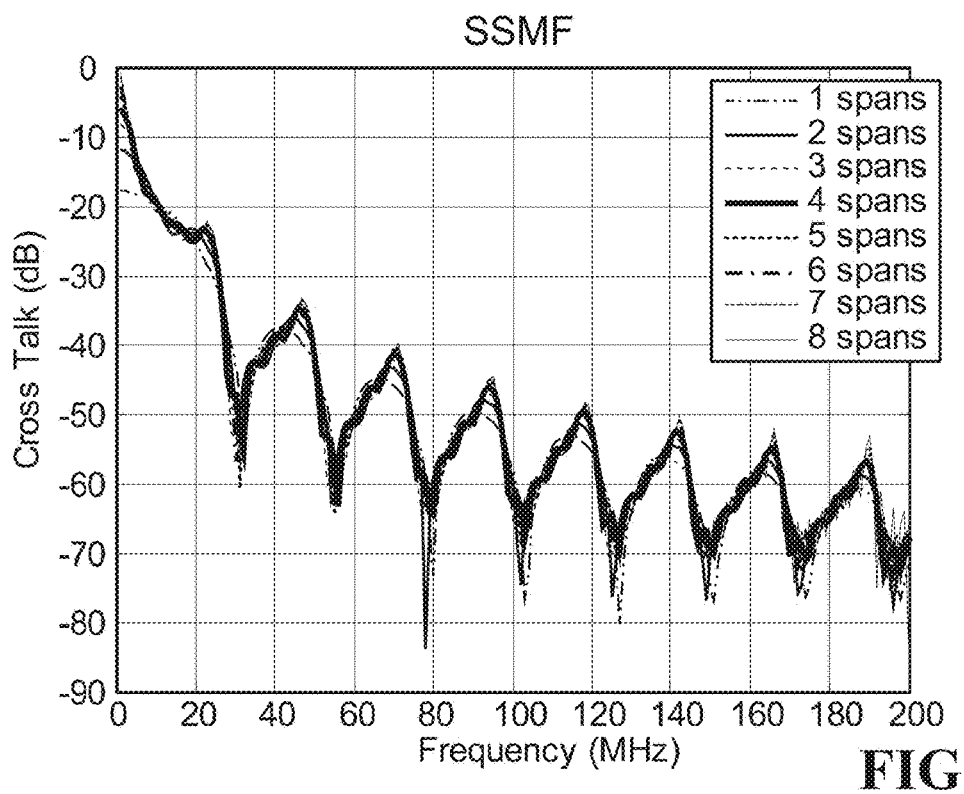

FIGS. 4A and 4B show examples of a simulated frequency dependence of SRS. Cross talk is plotted as a function of pilot tone frequency for a channel of interest. For these examples there are 80 channels in the C band, and the channel of interest is the first channel (shortest wavelength). FIG. 4A shows results of simulations conducted for LEAF™ fiber and FIG. 4B shows results of simulations conducted for standard single-mode fiber (SSMF). Both FIGS. 4A and 4B show results for varying numbers of spans, from one span to eight spans, with a span of 80 km in length. For the LEAF™ fiber simulation, there was −1 dBm per channel fiber input power, and for the SSMF simulation there was +1 dBm per channel fiber input power.

Figure 5:
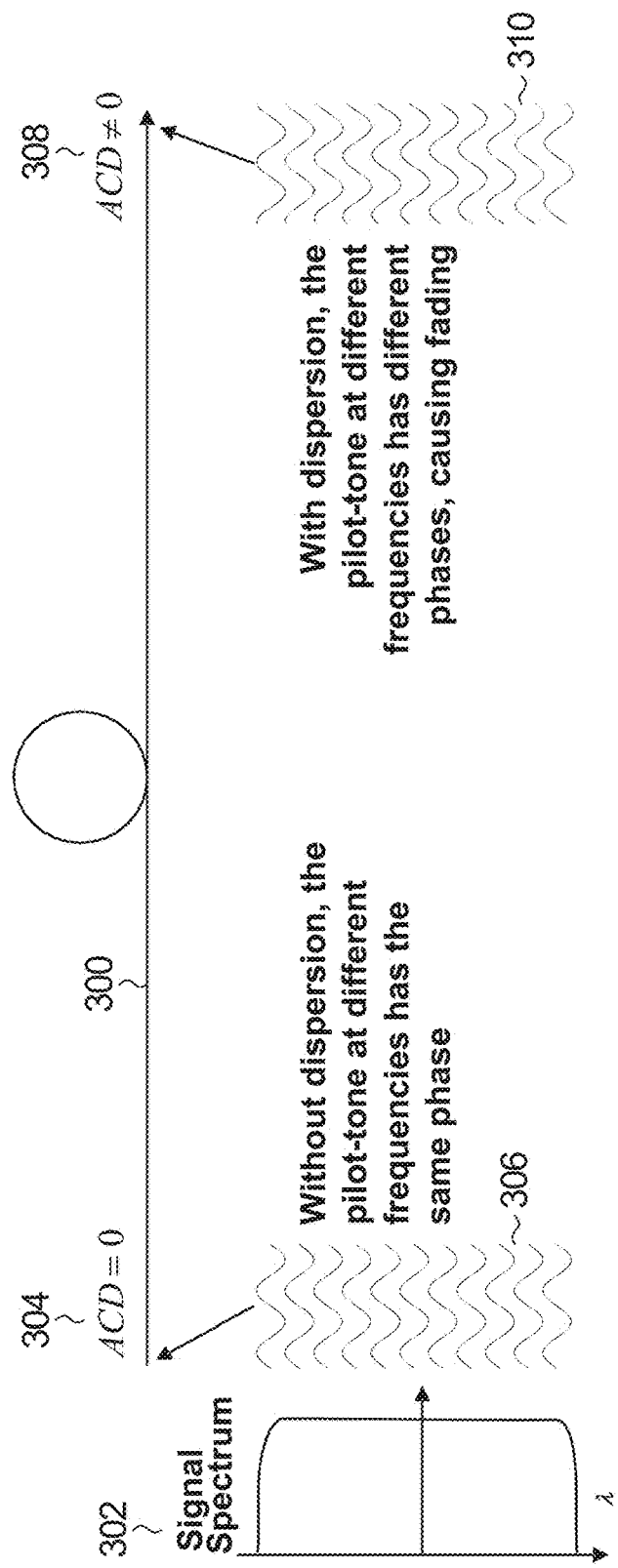
FIG. 5 is a graphical depiction of accumulated chromatic dispersion caused fading.

It can be seen that generally the cross talk decreases as frequency increases. Thus, from a cross talk minimization perspective, a higher pilot tone frequency is preferred. An explanation for this is that pump channels have ghost tones due to SRS, these tones are initially in phase, but incur phase differences due to chromatic dispersion. The higher frequency leads to larger phase difference, the ghost tones partially cancel each other An example of accumulated chromatic dispersion caused fading will now be described. For this example, S(Δf) is the spectral power of the optical signal, Δf is the frequency relative to the carrier frequency, $f_{PT}$ is the pilot tone frequency, $m_d$ is the modulation depth. The total pilot tone is $$A(t) = \int_{-\infty}^{+\infty} S(\Delta f) m_d \cos(2\pi f_{PT} t + \phi(\Delta f, f_{PT}, ACD)) d\Delta f$$

where $\phi(\Delta f, f_{PT}, ACD)$ is the relative phase for frequency component Δf after accumulated chromatic dispersion ACD. The relative phase is $$\phi(\Delta f, f_{PT}, ACD) = 2\pi f_{PT} \times ACD \frac{\lambda^2}{c} \Delta f$$

where λ is channel wavelength, and c is the speed of light in a vacuum. The effect of this will be described with reference to FIG. 5. Shown is an optical fiber 300. The signal spectrum is indicated at 302. The entire signal is modulated by a pilot tone. Without dispersion, for example at position 304 of the optical fiber 300, the pilot tone modulation at different frequencies across the signal spectrum 302 is the same. While shown at discrete frequencies, the single pilot tone is modulated across the entire spectrum. This is shown diagrammatically at 306. Later, at a position 308 located some distance along the fiber 300, there is a non-zero ACD. In the presence of ACD, the pilot tone modulation at different frequencies has a different phase, and this causes fading in the overall pilot tone. This is shown diagrammatically at 310 where the pilot tone at one end of the spectrum is shown with a phase shift relative to the pilot tone to the other end of the spectrum. While shown at discrete frequencies, the phase shift varies continuously for the single pilot tone across the entire spectrum.

Figure 6A:
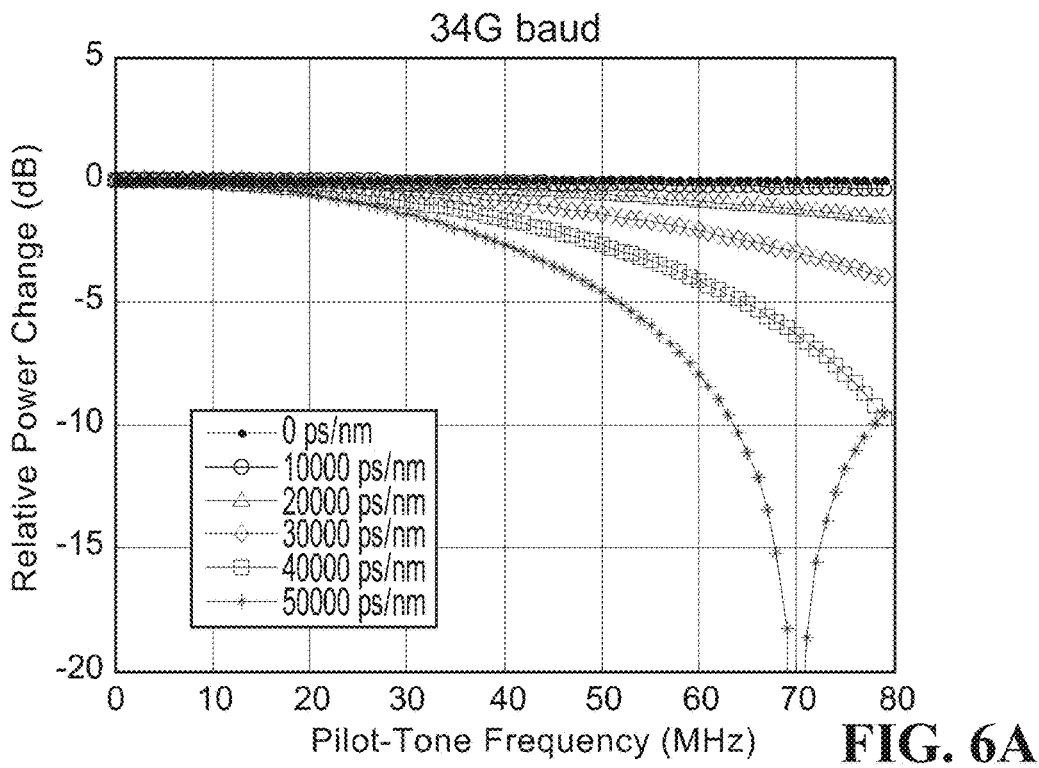
FIGS. 6A, 6B show an example of the frequency dependence of dispersion fading.
Figure 6B:
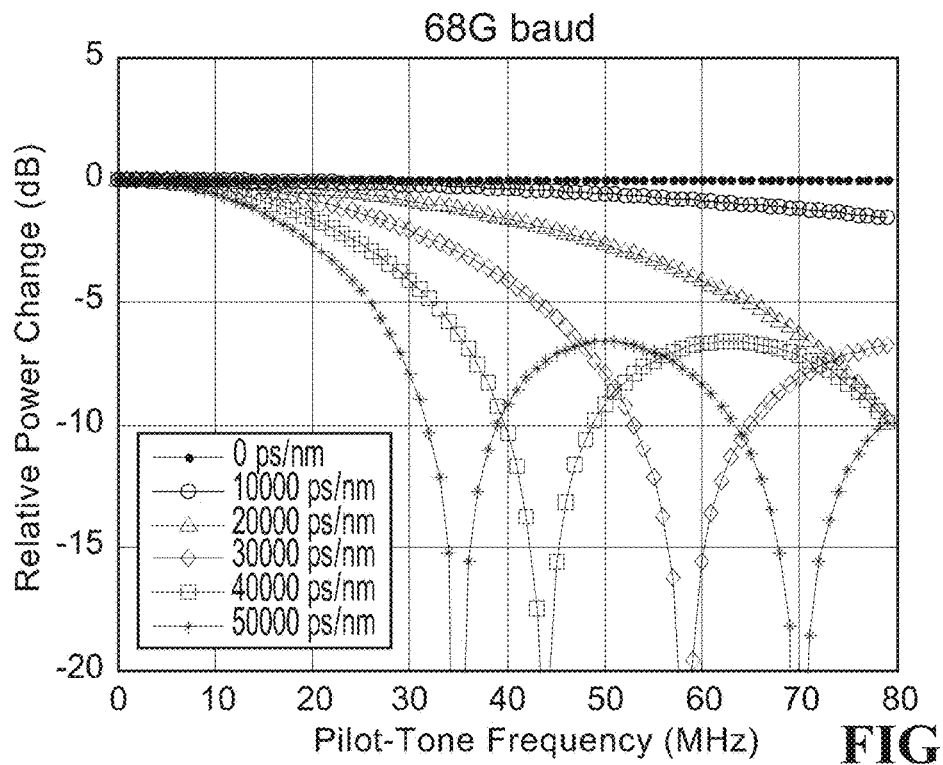

FIGS. 6A and 6B show simulated dispersion fading for a 34G baud and 68G baud Nyquist signal respectively. The relative power change measured for the pilot tone is plotted as a function of pilot tone frequency for various ACDs from 0 ps/nm to 50000 ps/nm. Significant chromatic dispersion fading can be seen that generally increases with pilot tone frequency, and that is more severe with higher baud rate (the FIG. 6B example). Thus, in order to have acceptable performance, it may be necessary to use a lower pilot tone frequency.

According to an embodiment of the invention, instead of applying a single pilot tone on the entire signal, the signal is divided into N spectral bands, and a respective pilot tone is applied to each spectral band. The pilot tones applied the bands differ from each other in some manner, for example in terms of frequency, phase offset. Detailed examples are described below.

Figure 7:
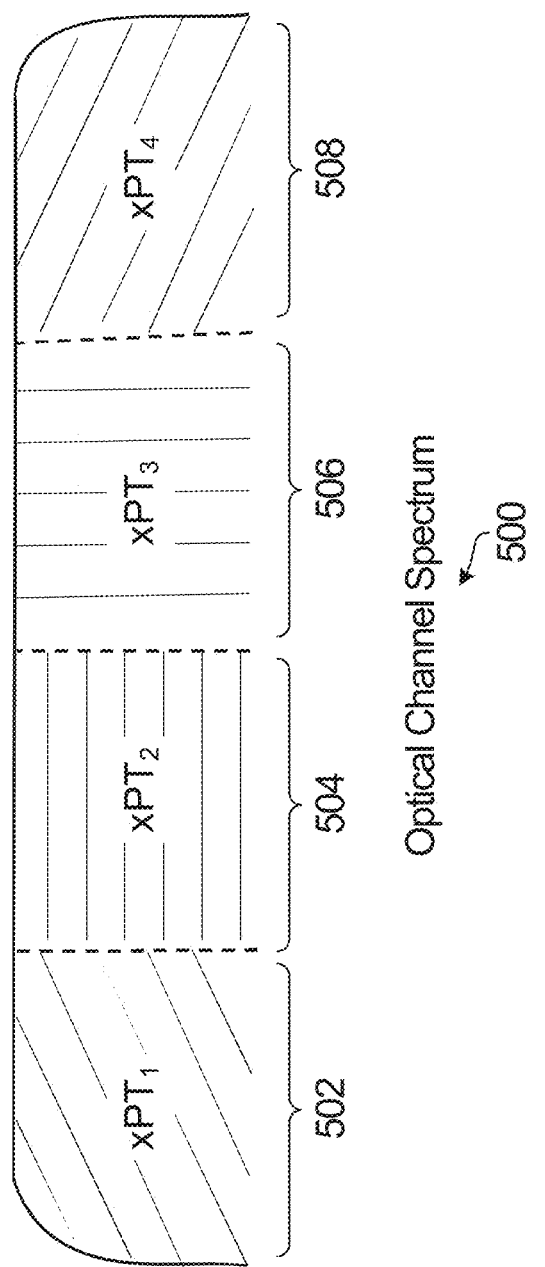
FIG. 7 depicts an optical channel spectrum with different pilot tones applied to each of N spectral bands.

The number N of spectral bands is an integer number greater than one. An example is shown in FIG. 7, where an optical channel spectrum 500 of a signal is divided into four bands 502,504,506,508, and a separate pilot tone is applied to each of the four bands. Pilot tone $PT_1$ is applied to Band 502. Pilot tone $PT_2$ is applied to band 504. Pilot tone $PT_3$ is applied to band 506. Pilot tone $PT_4$ is applied to band 508. The spectral bandwidth of the multiple spectral bands can be uniform or non-uniform.

In some embodiments, the pilot tone frequency applied on the spectral bands is the same. If the pilot tone frequencies applied to different bands are the same, then the pilot tones differ in some other manner. For example, their relative phase can be configured. In some embodiments, the pilot tone frequency is different for each spectral band.

In some embodiments, the approach is applied to a single carrier signal. In other embodiments, the approach is applied to a digital multi-band signal.

In some embodiments, one or more of the bands does not have a pilot tone applied at all, but in this case, at least two of the bands have applied pilot tones. The number of bands, modulation depth, frequency, phase etc. may change over time.

In a first specific example, all bands have respective pilot tones applied with the same frequency, and a pre-phase shift is applied between the pilot tones in different bands. In some embodiments, the pilot tones carry pilot tone data. Where the pilot tones differ in pre-phase, all pilot tones carry the same data.

Figure 8B:
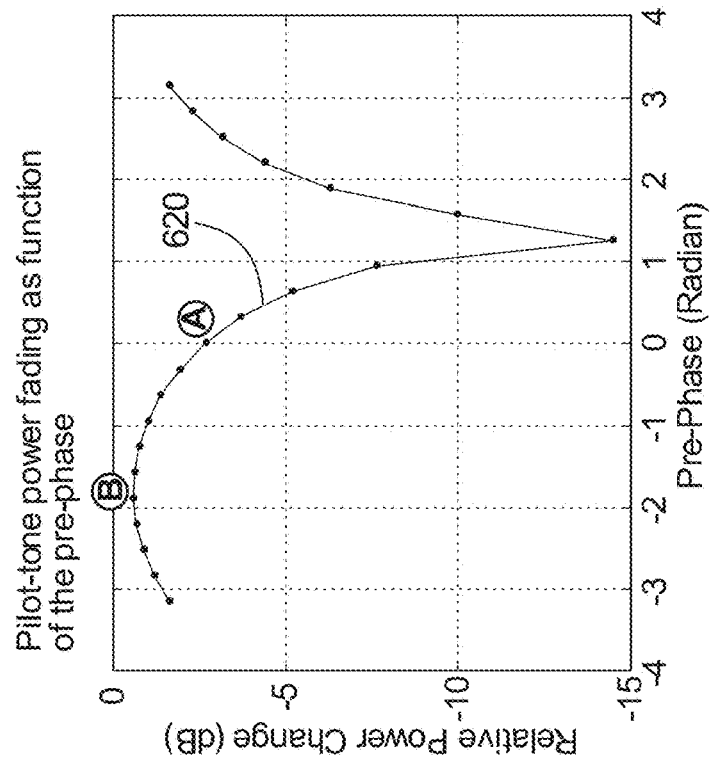
FIGS. 8A, 8B, 9A, 9B, 10A, 10B, 11A, 11B, 12A, 12B, 13A, 13B show various multi-band pilot tone simulation results.
Figure 8A:
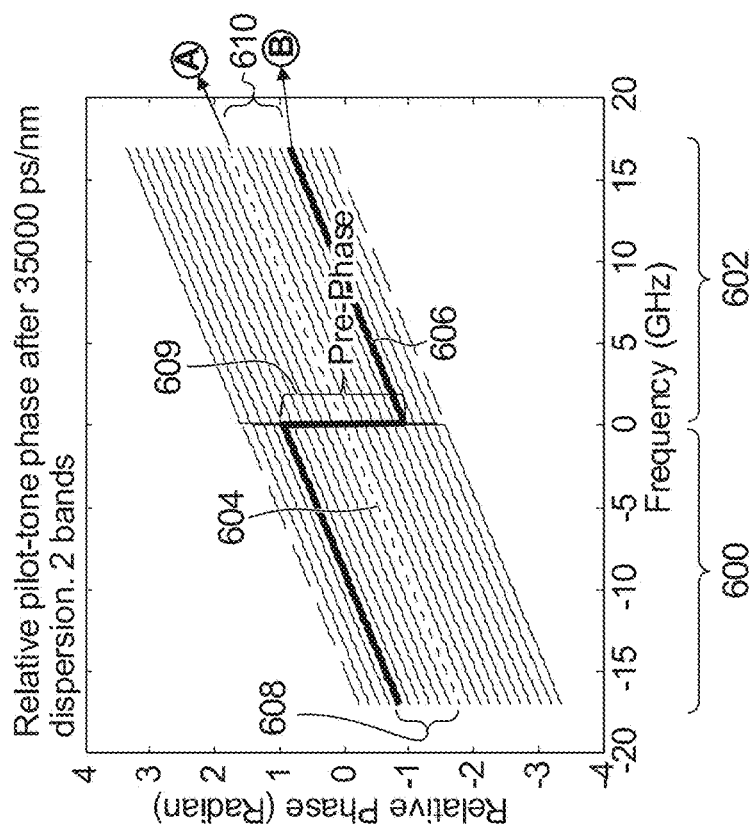

FIGS. 8A and 8B contain an example of multi-band pilot tone simulation results for various pilot tone pre-phases. FIG. 8A a plot of relative pilot tone phase as a function of frequency over a signal spectrum. For this example, the simulation parameters include a 34G baud rate, 35000 ps/nm accumulative chromatic dispersion, 60 MHz pilot tone frequency, and the signal spectrum is divided into two bands 600,602. Pilot tones with the same frequency are applied to the two bands 600,602 with a relative pre-phase applied as between the two pilot tones. One of the bands 602 contains positive frequencies (relative to the center frequency of the band), and the other of the bands 600 contains negative frequencies (relative to the center frequency of the band). There is a phase difference between the two pilot tones when they are generated. The vertical axis shows the relative pilot tone phase as a function of frequency over the signal spectrum after 35000 ps/nm dispersion.

Multiple curves are shown for different pre-phase amounts. Curve 604 represents a case where no pre-phase has been applied. This is equivalent to modulating the entire spectrum with one pilot tone. For curve 604, the relative pilot tone phase increases continuously from about −1.80 radians at the low frequency end of the signal spectrum to about +1.8 radians at the high frequency end of the spectrum. The maximum difference is about 3.6 radians.

Curve 606 has pre-phase amounts applied. In band 600, the applied pre-phase of about 0.9 radians is represented at 608, and in band 602, the applied pre-phase of about −0.9 radians is represented at 610. The relative pre-phase as between the two bands is indicated at 609, this being the difference between the amounts indicated at 608,610, namely about −1.8 radians. The result is that the relative pilot tone phase starts at about −0.9 radians at the low frequency end of band 600. This increases to about +0.9 radians at the high frequency end of band 600. Then it decreases to about −0.9 radians at the low frequency end of band 602, and increases to +0.9 radians at the high frequency end of band 602. Thus, the maximum phase difference is about 1.8 radians.

FIG. 8B shows pilot tone power fading plotted as a function of pre-phase in curve 620. The maximum of curve 620 occurs at Point B. Point B on curve 620 is the pilot tone fading for a pre-phase amount of −1.8 radians, i.e. the same amount as for curve 606 in FIG. 8A. Point A on curve 620 is the pilot tone power fading with no pre-phase amount. It can be seen that pilot tone fading is greatly improved with pre-phase (point B) compared to without pre-phase (point A).

Figure 9B:
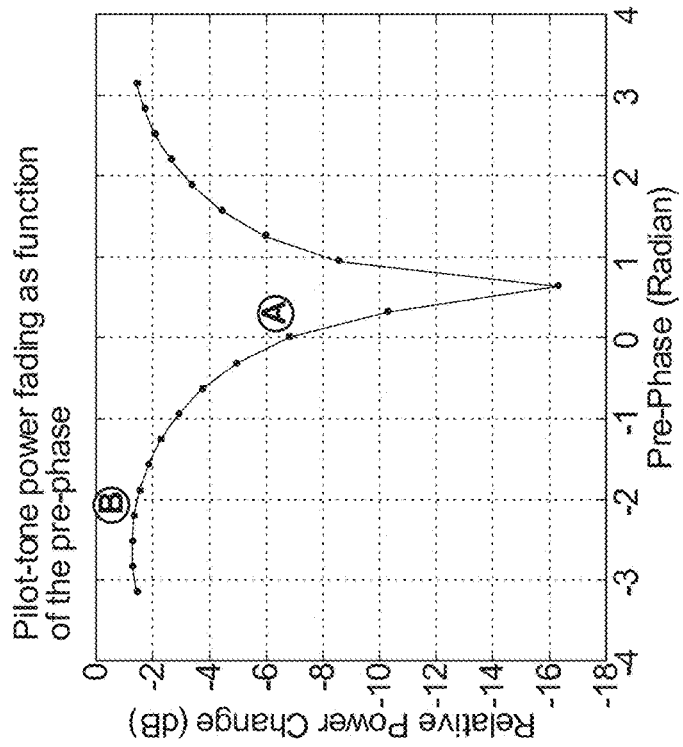
Figure 9A:
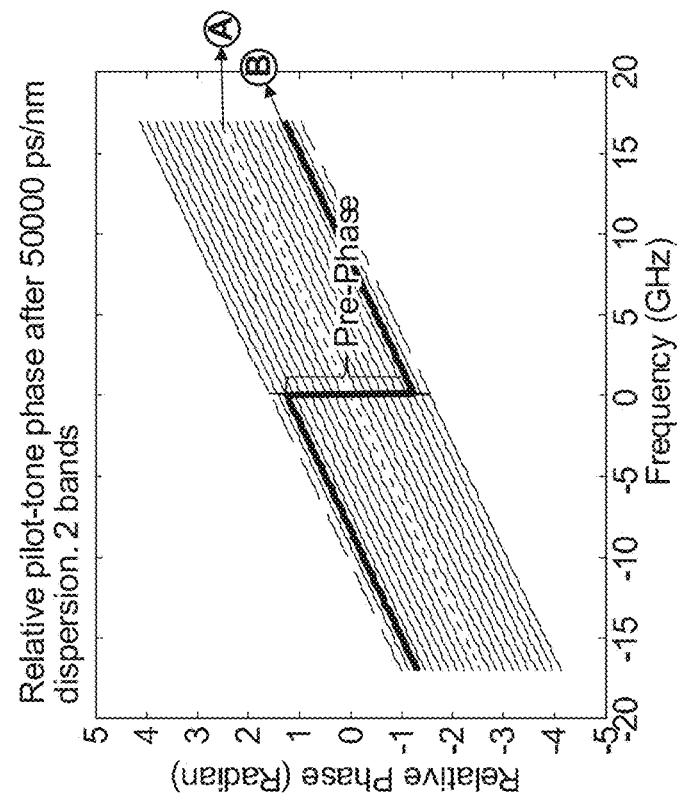

FIGS. 9A and 9B show similar simulation results for simulation parameters that include a 34G baud rate, 50000 ps/nm accumulative chromatic dispersion, 60 MHz pilot tone frequency, with the signal spectrum divided into two bands. Again, pilot tone power fading is greatly improved with pre-phase (B) compared to without pre-phase (A).

Figures 10A, 10B:
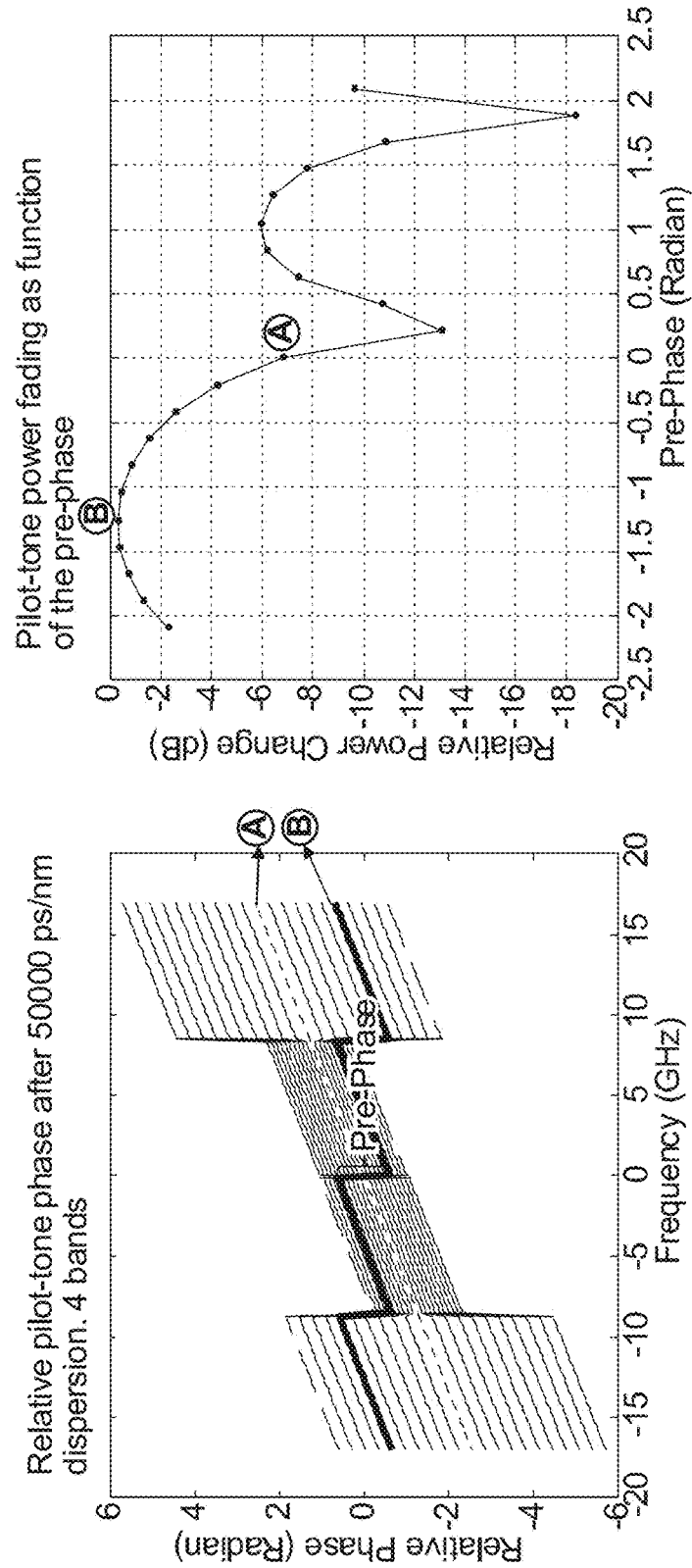

FIGS. 10A and 10B show similar simulation results for simulation parameters that include a 34G baud rate, 50000 ps/nm accumulative chromatic dispersion, 60 MHz pilot tone frequency, where the signal spectrum is divided into four bands. Again, the pilot tone power fading is greatly improved with pre-phase (B) compared to without pre-phase (A)

Figure 11B:
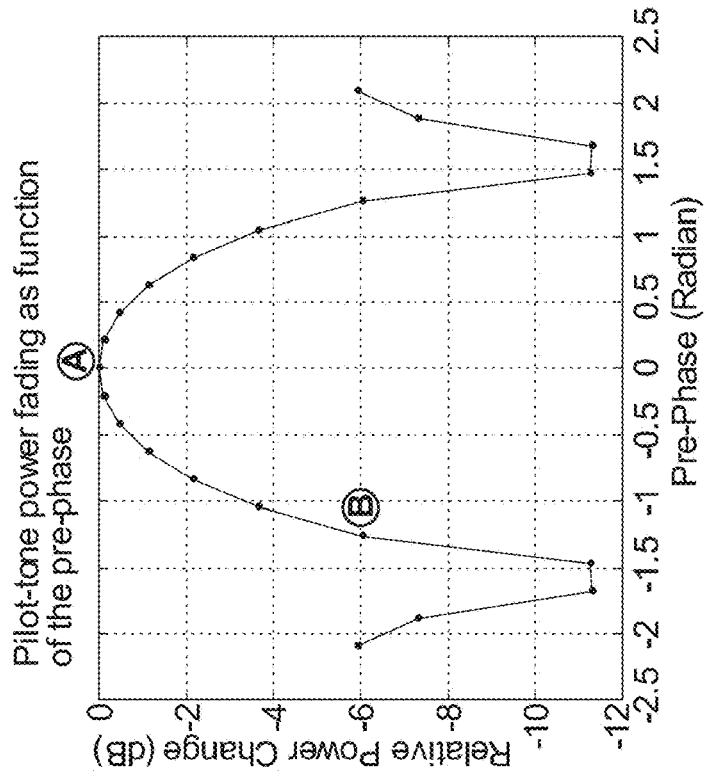
Figure 11A:
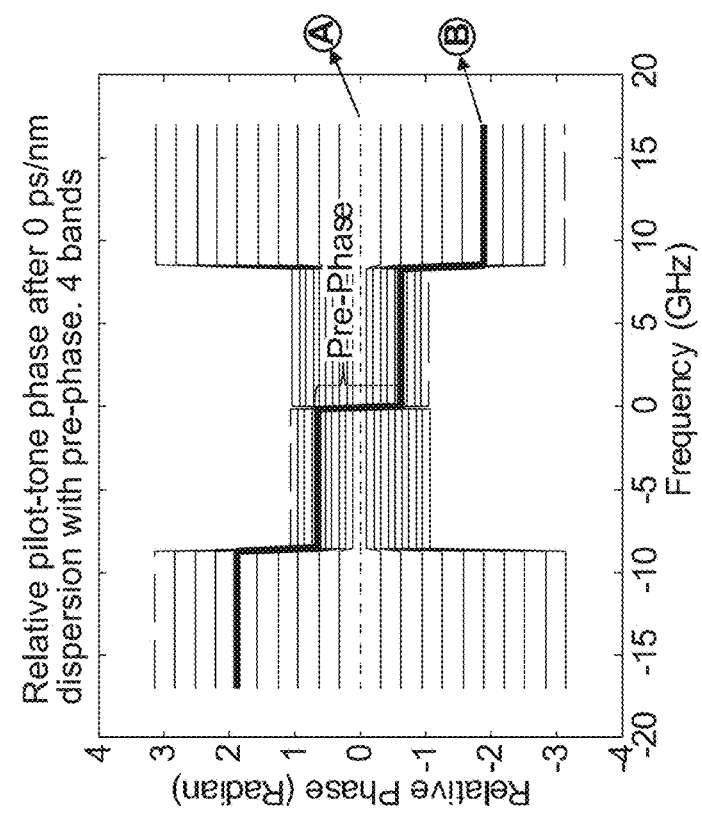

FIGS. 11A and 11B show similar simulation results for simulation parameters that include 34G baud rate, 0 ps/nm accumulative chromatic dispersion, 60 MHz pilot tone frequency, where the signal spectrum is divided into four bands. In this case, pilot tone power fading is degraded with pre-phase (B) compared to without pre-phase (A).

Figures 12A, 12B:
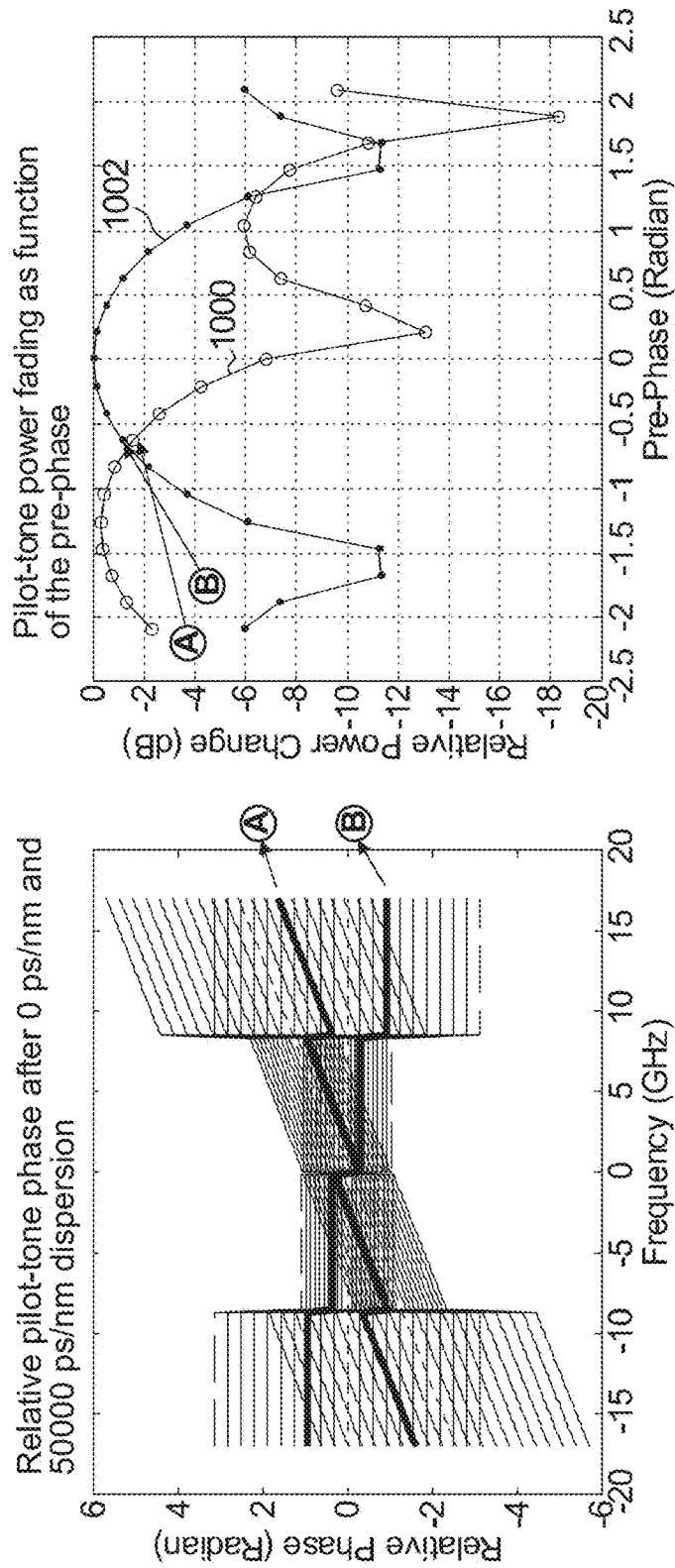

FIGS. 12A and 12B show similar simulation results for simulation parameters that include 34G baud rate, 0 and 50000 ps/nm accumulative chromatic dispersion, 60 MHz pilot tone frequency, where the signal spectrum is divided into four bands. In FIG. 12B, the performance or 0 dispersion is shown in curve 1000, and the performance for 50000 ps/nm is shown in curve 1002. In this case, pre-phase improves the fading with dispersion, but degrades if there is no dispersion. In reality, the dispersion can be different at different points in the network. In some embodiments, a pre-phase is selected to reach a compromise that will make the pilot tone fading worse at points of the network that experience lower dispersion, and better at points in the network that experience higher dispersion.

Figures 13A, 13B:
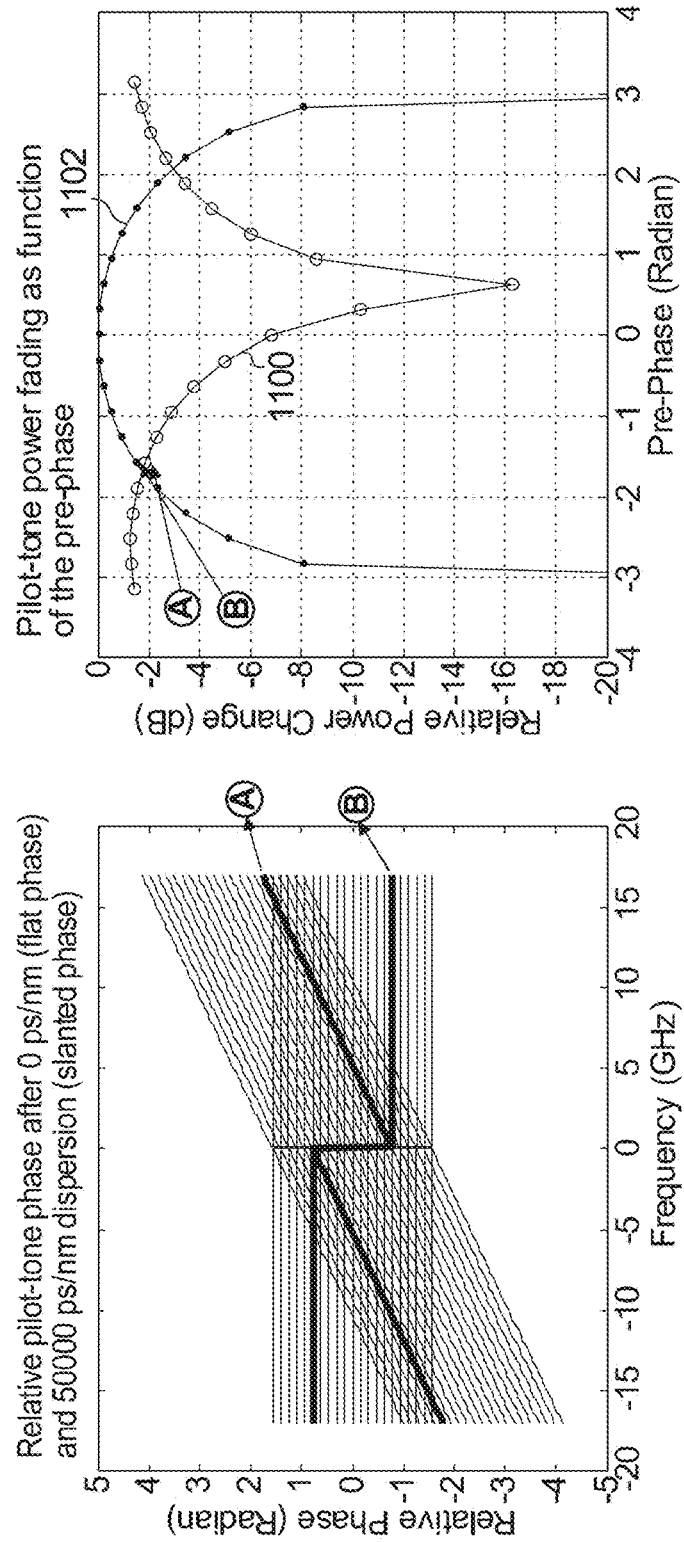

FIGS. 13A and 13B show similar simulation results for simulation parameters that include 34G baud rate, 0 and 50000 ps/nm accumulative chromatic dispersion, 60 MHz pilot tone frequency, where the signal spectrum is divided into two bands. In FIG. 13B, the performance or 0 dispersion is shown in curve 1100, and the performance for 50000 ps/nm is shown in curve 1102. As in the example of FIGS. 10A,10B, pre-phase improves the fading with dispersion, but degrades if there is no dispersion.

In another detailed example, the pilot tone applied to each spectral band has a different pilot tone frequency. For an N band pilot tone, the dispersion fading is 1/N of that of a single band.

In some embodiments, each pilot tone is modulated with a different frequency different pilot tone data (Case A). In some embodiments, each pilot tone is modulated with a different frequency and the same data (Case B). The signal-to-noise ratio (SNR) for the data is relatively higher when each pilot tone is modulated with the same data compared to the case where each pilot tone is modulated with different data.

For any of the embodiments described herein, a receiver can process a received signal to perform optical performance monitoring. Part of this may, for example, involve optical channel detection. This can be done by detecting the power of pilot tones transmitted for different optical channels.

For the embodiments described above involve applying pilot tones with different pre-phases to spectral bands with pilot tones, pilot tone power detection is performed in the same way as it would be had the entire band been modulated with a single pilot tone.

For the embodiments described above involving applying pilot tones to spectral bands, the pilot tones having different frequencies with different data (case A), detection can be performed in each band in the same way as if a single pilot tone was applied to a single large band. An overall result can be obtained by summing the powers in all of the bands. For the embodiments described above involving applying pilot tones to spectral bands with the pilot tones having different frequencies with the same data (case B), the detection results for the multi-band pilot tones are combined to derive the total pilot tone power, and to recover the pilot tone data. In some cases, it may be possible to use one pilot tone to recover the pilot tone data, provided that the SNR is good enough.

Multiband Pilot Tone Generation

For conventional single pilot tone modulation, the pilot tone modulated signal can be produced according to:

$$V_{LS}(t)=V(t)(1+m_d \sin(2\pi f_{LS} t))$$

where V(t) is the signal prior to pilot tone modulation, $m_d$ is the modulation depth, and $f_{LS}$ is the frequency of the single pilot tone.

The following is an example of how the multi-band pilot can be applied. This approach may be implemented in a DSP, for example. In this example, there are two bands, and φ is the pre-phase applied to mitigate dispersion fading, but a similar approach can be applied to any of bands, and using pilot tones that differ in other manners, for example pilot tone frequency.

The first step is to convert the entire signal to the frequency domain with an FFT:

$$V(\omega)=\text{FFT}(V(t))$$

Next, the spectrum is split into positive and negative bands (more generally any number of bands):

$$V^+(\omega)=V(\omega \geq 0),\ V^-(\omega)=V(\omega<0)$$

and each spectral band is converted back to the time domain:

$$V^+(t)=i\text{FFT}(V^+(\omega)),\ V^-(t)=i\text{FFT}(V^-(\omega))$$

Next, each band is in the time domain separately with a respective pilot tone, for example, with a pre-phase applied to one of the two bands in this example. The results are combined to yield a multiband signal:

$$V_{LS}(t)=V^+(t)(1+m_d \sin(2\pi f_{LS}t))+V^-(t)(1+m_d \sin(2\pi f_{LS}t+\phi))$$

Figure 14:
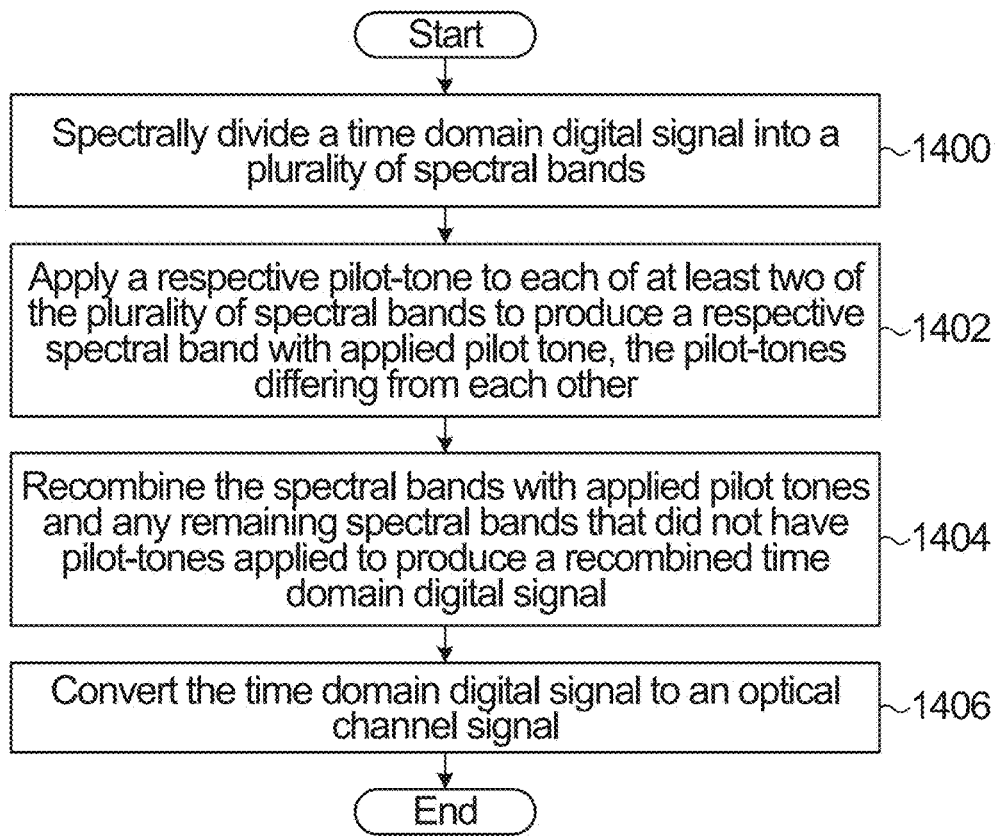
FIG. 14 is a flowchart of a method of applying pilot tones provided by an embodiment of the invention.

FIG. 14 is a flowchart of a method of applying pilot tones provided by an embodiment of the invention. The method begins at 1400 with spectrally dividing a time domain digital signal into a plurality of spectral bands. However, note that step 1400 is not necessary in the case that the method is to be applied to multiple digital sub-band signals. The method continues at 1402 with applying a respective pilot tone to each of at least two of the plurality of spectral bands to produce a respective spectral band with applied pilot tone, the pilot tones differing from each other. The method continues at 1404 with recombining the spectral bands with applied pilot tones and any remaining spectral bands that did not have pilot tones applied to produce a recombined time domain digital signal. Finally, the recombined time domain digital signal is converted to an optical channel signal at 1406. Typically, the optical channel signal would then be transmitted. Any of the alternatives and modifications described herein can be applied with the method of FIG. 14. Optionally, the optical channel signal may be combined with other optical channel signals before transmission.

Figure 15:
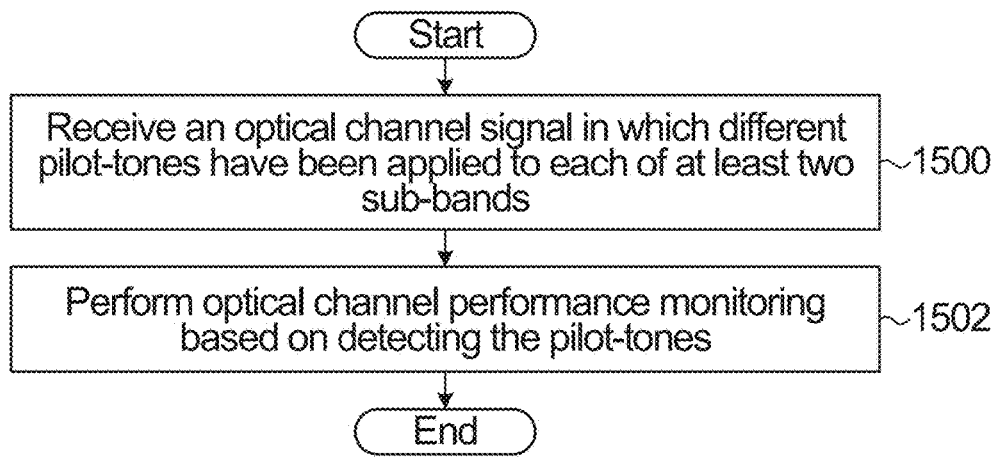
FIG. 15 is a flowchart of a method of performing optical channel performance monitoring provided by an embodiment of the invention.

FIG. 15 is a flowchart of a method of performing optical channel performance monitoring provided by an embodiment of the invention. The method begins at 1500 with receiving an optical channel signal in which different pilot tones have been applied to each of at least two sub-bands. The optical channel signal may be part of a signal containing multiple optical channels. The method continues at 1502 with performing optical channel performance monitoring based on detecting the pilot tones. Any of the alternatives and modifications described herein can be applied with the method of FIG. 15.

Figure 16A:
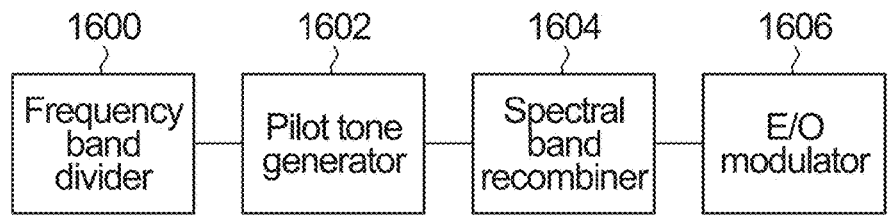
FIG. 16A is a block diagram of an apparatus for applying pilot tones provided by an embodiment of the invention.

FIG. 16A is a block diagram of an apparatus for applying pilot tones provided by an embodiment of the invention. The apparatus includes a frequency band divider 1600 for spectrally dividing a time domain digital signal into a plurality of spectral bands, and a pilot tone generator 1602 for applying a respective pilot tone to each of at least two of the plurality of spectral bands to produce a respective spectral band with applied pilot tone, the pilot tones differing from each other. The frequency band divider 1600 is not necessary for embodiments in which the input is multiple digital sub-band signals. The apparatus also includes a spectral band recombiner 1604 for recombining the spectral bands with applied pilot tones and any remaining spectral bands to which pilot tones were not applied to produce a recombined time domain digital signal. The apparatus also includes an electrical-to-optical modulator 1606 for converting the recombined time domain digital signal to an optical channel signal for transmission. Any of the alternatives and modifications described herein can be applied with the apparatus of FIG. 16A.

Figure 16B:
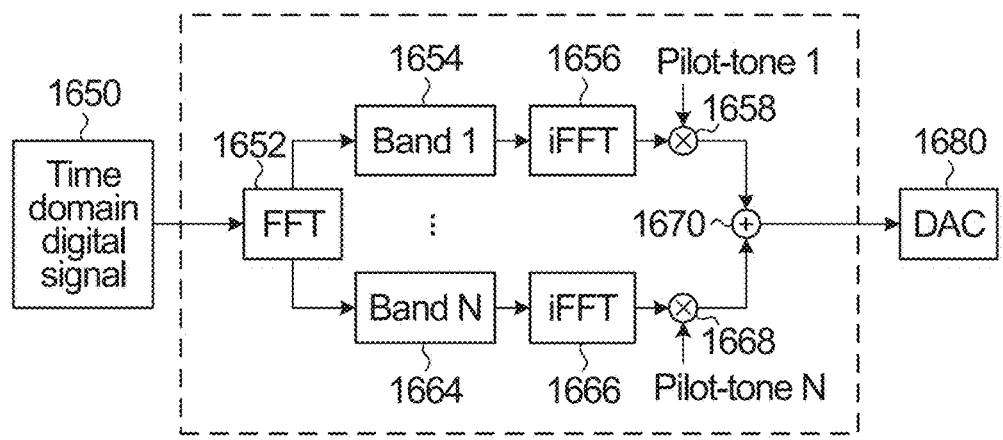
FIG. 16B is a block diagram of an apparatus for applying pilot tones provided by an embodiment of the invention.

FIG. 16B is a block diagram of another apparatus for applying pilot tones provided by an embodiment of the invention. The apparatus includes an FFT 1652 converting a time domain digital signal 1650 into a frequency domain signal. The frequency domain signal is split into multiple bands 1654,1664. Each band is then converted back to a respective time domain digital signal with a respective IFFT 1656,1666. Note that components 1652, 1654, 1656, 1664, 1666 collectively are a specific example of the frequency band divider 1600 of FIG. 16A. Multipliers 1658,1668 are used to apply respective pilot tone modulations to the two time domain digital signals, and the pilot tone modulated signals are recombined at 1670 prior to digital to analog conversion 1680. Any of the alternatives and modifications described herein can be applied with the apparatus of FIG. 16B.

Figure 17:
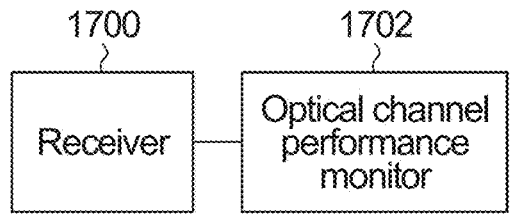
FIG. 17 is a block diagram of an apparatus for performing optical channel performance monitoring provided by an embodiment of the invention.

FIG. 17 is a block diagram of an apparatus for performing optical channel performance monitoring provided by an embodiment of the invention. The apparatus includes a receiver 1700 for receiving an optical channel signal in which different pilot tones have been applied to each of at least two sub-bands. The apparatus also includes an optical channel performance monitor 1702 for performing optical channel performance monitoring based on detecting the pilot tones. Any of the alternatives and modifications described herein can be applied with the apparatus of FIG. 17.

The described embodiment make use of a frequency band divider to divide the spectrum of a signal, and following this pilot tone modulation is applied to each spectral band. In another embodiment, for any of the previously described embodiments, no frequency band divider is provided. Rather, an input to the system and method is multiple different sub-bands that carry different bit streams, from a single source or from multiple individual sources. These different sub-bands are modulated with respective pilot tones, before being combined.

This approach can be realized from the method of FIG. 14 by omitting block 1400, and from the apparatus of FIG. 16A by omitting the frequency band divider 1600, and from the apparatus of FIG. 16B by omitting the FFT 1652, and treating the two bands 1654 as different sub-band inputs from a single or multiple individual sources.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   for each of at two of a plurality of spectral band signals, each spectral band signal occupying a respective one of a plurality of adjacent spectral bands, modulating the spectral band signal with a respective pilot tone to produce a respective spectral band signal with applied pilot tone by multiplying the respective pilot tone with the respective spectral band signal, the pilot tones differing from each other;
   combining the spectral band signals with applied pilot tones and any remaining spectral band signals to which a pilot tone was not applied to produce a combined time domain digital signal;
   converting the combined time domain digital signal to an optical channel signal.

2. The method of claim 1 further comprising:
   spectrally dividing a time domain digital signal into the plurality of spectral band signals, such that a frequency domain representation of the time domain digital signal at a given frequency is substantially equal to a frequency domain representation at the given frequency of the one of the spectral band signals for which the respective spectral band contains the given frequency.

3. The method of claim 1 wherein at least two the plurality of spectral bands are digital sub-bands from a same source or from different sources.

4. The method of claim 1 wherein a respective pilot tone is applied to every spectral band signal of the plurality of spectral band signals.

5. The method of claim 1 wherein there is at least one remaining spectral band signal to which a pilot tone was not applied.

6. The method of claim 1 wherein the pilot tones differ from each other in that they carry different pilot tone data.

7. The method of claim 1 wherein the pilot tones differ from each other in that each pilot tone has a different pilot tone frequency.

8. The method of claim 7 wherein the pilot tones carry the same pilot tone data.

9. The method of claim 7 wherein the pilot tones carry different pilot tone data.

10. The method of claim 1 wherein the pilot tones have the same frequency and differ from each other in that each has a different pre-phase.

11. The method of claim 10 wherein the pilot tone pre-phases are selected based on a compromise between improving fading with higher dispersion, and degrading fading with lower dispersion.

12. The method of claim 2 wherein spectrally dividing the time domain digital signal and applying the pilot tones comprises performing the following steps in the order recited:
   applying an FFT to the time domain digital signal to produce a frequency domain signal;
   splitting the frequency domain signal into the plurality of spectral bands;
   applying a respective IFFT to each of the plurality of spectral bands to produce the respective spectral band signal; and
   multiplying each spectral band signal with the respective pilot tone.

13. The method of claim 1, further comprising: changing at least one of the pilot tones over time by changing at least one of:
   modulation depth;
   pilot tone frequency;
   pilot tone phase;
   a number of pilot tones.

14. An apparatus comprising:
   a pilot tone modulator configured to, for each of at two of a plurality of spectral band signals, each spectral band signal occupying a respective one of a plurality of adjacent spectral bands, modulate the spectral band signal with a respective pilot tone to produce a respective pilot tone modulated spectral band signal by multiplying the respective pilot tone with the respective spectral band signal, the pilot tones differing from each other;
   a spectral band combiner for recombining the pilot tone modulated spectral band signals and any remaining spectral band signals that were not modulated by respective pilot tones to produce a combined time domain digital signal;
   an electrical to optical modulator for converting the combined time domain digital signal to an optical channel signal.

15. The apparatus of claim 14 further comprising:
   a frequency band divider for spectrally dividing a time domain digital signal into the plurality of spectral band signals, such that a frequency domain representation of the time domain digital signal at a given frequency is substantially equal to a frequency domain representation at the given frequency of the one of the spectral band signals for which the respective spectral band contains the given frequency.

16. The apparatus of claim 14 configured to apply a respective pilot tone to every spectral band of the plurality of spectral bands.

17. The apparatus of claim 14 configured to generate pilot tones that differ from each other in that they carry different pilot tone data.

18. The apparatus of claim 14 configured to generate pilot tones that differ from each other in that each pilot tone has a different pilot tone frequency.

19. The apparatus of claim 14 configured to generate the pilot tones having the same frequency and differing from each other in that each has a different pre-phase.

20. The apparatus of claim 15 wherein the frequency band divider is configured to perform the following steps in the order recited:
   apply an FFT to the time domain digital signal to produce a frequency domain signal;
   split the frequency domain optical channel signal into the plurality of spectral bands;
   applying a respective IFFT to each of the plurality of spectral bands to produce a respective waveform.

* * * * *